US007937114B2

(12) United States Patent
Yamagishi

(10) Patent No.: US 7,937,114 B2
(45) Date of Patent: May 3, 2011

(54) MOBILE PHONE DISPLAY PROCESSING CONTROL OF SINGLE BUFFERING OR DOUBLE BUFFERING BASED ON CHANGE IN IMAGE DATA

(75) Inventor: Masahiro Yamagishi, Hino (JP)

(73) Assignee: Fujitsu Toshiba Mobile Communication Limited, Kawasaki (JP)

( * ) Notice: Subject to any disclaimer, the term of this patent is extended or adjusted under 35 U.S.C. 154(b) by 633 days.

(21) Appl. No.: 12/001,198

(22) Filed: Dec. 10, 2007

(65) Prior Publication Data

US 2009/0002384 A1 Jan. 1, 2009

(30) Foreign Application Priority Data

Jun. 28, 2007 (JP) ................................ P2007-170839

(51) Int. Cl.
*H04M 1/00* (2006.01)

(52) U.S. Cl. .................... 455/566; 455/90.3; 455/414.4; 455/418; 345/532; 345/545; 345/551; 365/189.05

(58) Field of Classification Search .................. 455/566, 455/90.3, 414.4, 418, 550.1, 558; 345/422, 345/468, 503, 530–551; 365/189.05; 370/509; 375/240.24
See application file for complete search history.

(56) References Cited

U.S. PATENT DOCUMENTS

| | | | | |
|---|---|---|---|---|
| 5,488,488 | A * | 1/1996 | Shimizu | 358/468 |
| 5,543,824 | A * | 8/1996 | Priem et al. | 345/539 |
| 5,610,630 | A * | 3/1997 | Nakamura et al. | 715/788 |
| 5,657,478 | A * | 8/1997 | Recker et al. | 345/503 |
| 5,978,052 | A * | 11/1999 | Ilcisin et al. | 348/797 |
| 6,384,868 | B1 * | 5/2002 | Oguma | 348/564 |
| 7,489,316 | B2 * | 2/2009 | Gong et al. | 345/539 |
| 7,657,673 | B2 * | 2/2010 | Ueda | 710/52 |
| 7,683,906 | B2 * | 3/2010 | Senior et al. | 345/539 |
| 2002/0054243 | A1 * | 5/2002 | Sakamoto | 348/714 |
| 2002/0180744 | A1 * | 12/2002 | Takala et al. | 345/545 |
| 2006/0227625 | A1 * | 10/2006 | Chiu et al. | 365/189.01 |

FOREIGN PATENT DOCUMENTS

JP 2006-98765 A 4/2006

* cited by examiner

*Primary Examiner* — Matthew D. Anderson
*Assistant Examiner* — Shaima Q Aminzay
(74) *Attorney, Agent, or Firm* — Maschoff Gilmore & Israelsen

(57) ABSTRACT

According to an aspect of the invention, there is provided a mobile phone including: a calculating unit configured to calculate an update range of the update data; an input-side switch unit configured to switch a first frame buffer of the plurality of frame buffers to which the update data is to be inputted; and an output-side switch unit configured to switch a second frame buffer of the plurality of frame buffers from which the update data is to be outputted. If the calculated update range is equal to or greater than a predetermined value, the input-side switch unit is connected to the first frame buffer different from the second frame so as to input the update data. If the input-side switch unit completes the input of the update data, the output-side switch unit is connected to the first frame buffer so as to output the update data.

17 Claims, 10 Drawing Sheets

MOBILE PHONE DISPLAY PROCESSING CONTROL OF SINGLE BUFFERING OR DOUBLE BUFFERING BASED ON CHANGE IN IMAGE DATA

CROSS-REFERENCE TO RELATED APPLICATIONS

This application is based on and claims the benefit of priority from the prior Japanese Patent Application No. 2007-170839, filed on Jun. 28, 2007; the entire contents of which are incorporated herein by reference.

TECHNICAL FIELD

The present invention relates to a mobile phone in which a process of screen update is done with buffers, such as a single buffer or a double buffer.

BACKGROUND

It is known to asynchronously perform writing to the frame buffer and reading of display data therefrom where the display refresh rate and the display memory (frame buffer, from now on) are configured as one set (single buffer). In this case, tearing is to occur upon each update in the case that update is in the same direction wherein those overlap in timing or that update is in directions rotated by 90 degrees.

Tearing refers to a phenomenon causing the user to perceive flickers because display different in time is made simultaneously in the upper and lower regions or in the right-side and left-side regions of the display screen because of the deviation caused between the timing of updating screen data and the timing thereof onto the display. Usually, tearing is observed as a linear form in the same direction of update where writing and reading are in an intersection at 0 degree, and as an oblique line where writing and reading are in an intersection at 90 degree.

It is disclosed by, for example JP-A-2006-98765, that a refresh rate is decided depending upon whether the image to display is a moving image or a still image in order to avoid such tearing, and that image quality is prevented from being lowered by flickers when displaying a still image content without imparting discomfort to the viewer due to tearing upon displaying a moving image content.

To avoid from tearing, frame buffers may be mounted on two surfaces (double buffer). With a double buffer, writing and reading of display data are made to and from respective, different frame buffers so that the frame buffer is switched over to output the display data upon completion of the writing.

Where display control is performed by using a double-buffer scheme, the display side perform switching of the frame buffer and reads display data therefrom after display data is completely written to the frame buffer. The time required up to display on the screen is longer as compared to the case using a single buffer. Consequently, the user possibly feels, as a depiction delay, the difference in time between user's instruction for display and actual coming into display.

In addition to the pixel density increase and vertically-oriented display of LCD screen such as the WVGA (wide video graphic array) of the mobile phone, there arise situations that, for the browser, etc., the user feels tearing and display process delay more frequently than ever upon update of the LCD screen.

SUMMARY

According to an aspect of the invention, there is provided a mobile phone that a display screen is updated by using a plurality of frame buffers to output update data inputted therein after being temporarily stored, including: a calculating unit configured to calculate an update range of the update data; an input-side switch unit configured to switch a first frame buffer of the plurality of frame buffers to which the update data is to be inputted; and an output-side switch unit configured to switch a second frame buffer of the plurality of frame buffers from which the update data is to be outputted. If the calculated update range is equal to or greater than a predetermined value, the input-side switch unit is connected to the first frame buffer different from the second frame so as to input the update data. If the input-side switch unit completes the input of the update data, the output-side switch unit is connected to the first frame buffer so as to output the update data.

BRIEF DESCRIPTION OF THE DRAWINGS

In the accompanying drawings.

DESCRIPTION OF THE EMBODIMENT

Figure 1:
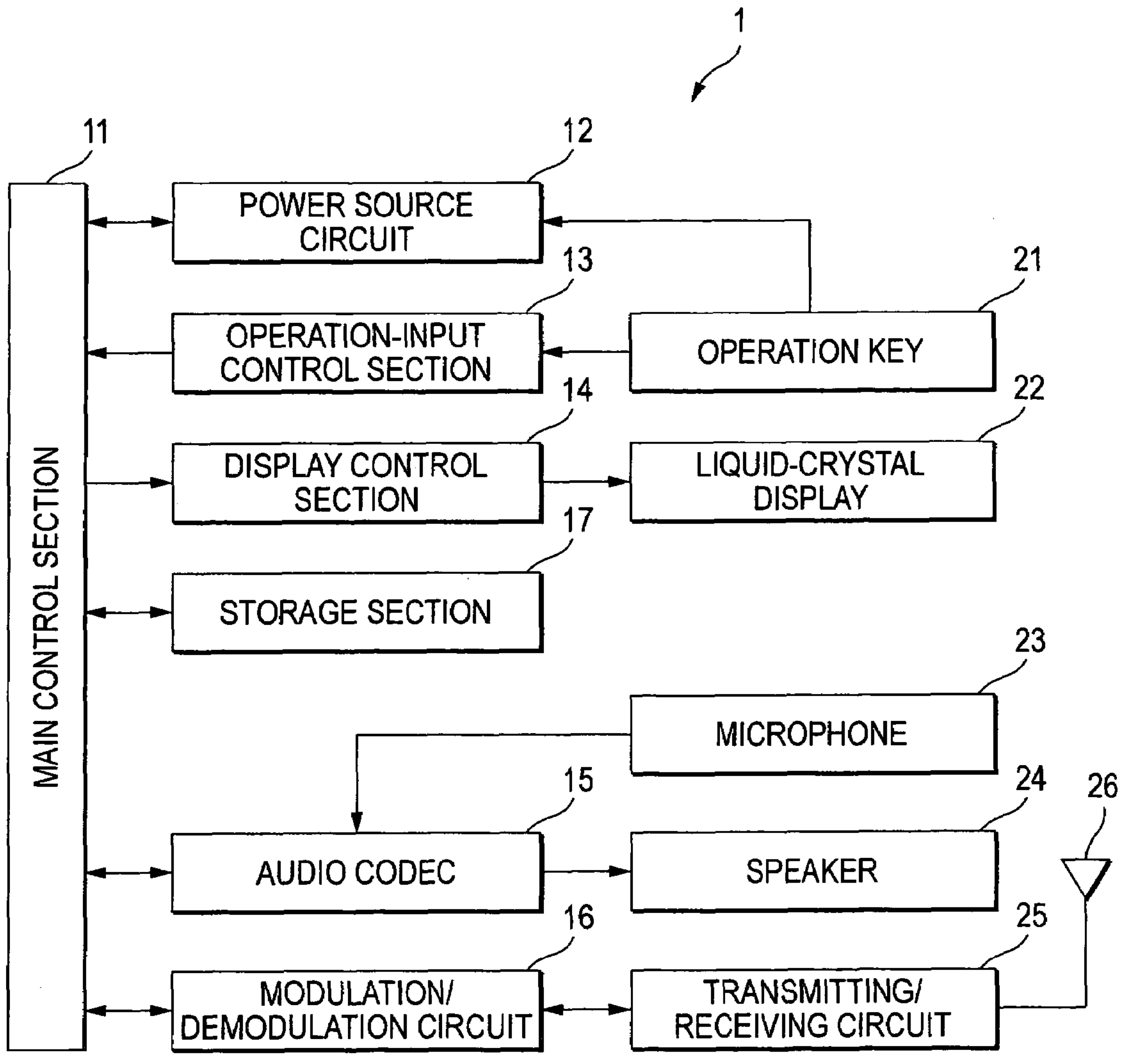
FIG. 1 shows a functional block diagram of a mobile phone according to an embodiment of the invention.

While referring to the appended drawings, explanation will be made on a mobile phone according to an embodiment of the present invention. FIG. 1 is a functional block diagram of a mobile phone. The mobile phone 1 includes a main control section 11, a power source circuit 12, an operation-input control section 13, a display control section 14, an audio codec 15, a modulation/demodulation circuit 16 and a storage section 17, as shown in FIG. 1. Those are connected together by means of a bus.

The main control section 11 has a CPU (central processing unit) for performing various data processes and arithmetic operations, to take total control of the mobile phone 1 and perform the processes of on-screen display and screen update, referred later, and other various operations and control processes. The power source circuit 12 is to switch the on-off state of the power source, depending upon user's input through an operation key 21. When the power source is in an on state, power is supplied from the power source (battery or the like) to various sections, thereby enabling the operation of the mobile phone 1.

The operation-input control section 13 is to convey the data, inputted by the operation key 21, to the main control section 11. The display control section 14 is to perform the process of on-screen display to display document data, still image data, moving image data, etc. on the liquid-crystal display 22, under control of the main control section 11. Meanwhile, the display control section 14 is to perform the process of screen update to update a part or the entire of the screen 40 being displayed on the liquid-crystal display 22.

The mobile phone 1 is to perform the process of voice communication with another telephone through a base station (not shown) for example. Namely, the audio codec 15 is to produce an analog speech signal from the talk collected by the microphone 23. In case an analog signal is inputted from the audio codec 15 during voice communication, the modulation/demodulation circuit 16 converts the signal into a digital signal and delivers it to the transmitting/receiving circuit 25. The transmitting/receiving circuit 25 sends the digital audio signal through an antenna 26. The modulation/demodulation circuit 16 converts the digital audio signal, received through the transmitting/receiving circuit 25, into an analog speech signal. During voice communication, the audio codec 15 acquires an analog speech signal from the modulation/demodulation circuit 16 and outputs it as a speech through the speaker 24.

The mobile phone 1 is to perform the process of data communication with an external terminal 3 or another mobile phone 1. Namely, the mobile phone 1 is to perform the process of transmitting and receiving various data, such as electronic mails, image data and video data. When receiving data, the main control section 11 subjects the signal, received at the antenna 26, to an inverse spread spectrum process at the modulation/demodulation circuit 16, thereby recovering the data. According to the instruction of the main control section 11, the data is displayed on the liquid-crystal display 22 through the display control section 14, stored in the storage section 17 or so. Meanwhile, when sending the data inputted through the operation input section 13 or stored in the storage section 17, the main control section 11 performs a spread spectral process on the data at the modulation/demodulation circuit 16 and sends it through the antenna 26.

The storage section 17 is formed by an electric storage device, such as a ROM (read only memory) storing processing and application programs for the main control section 11 to execute, a magnetic storage device such as a hard disk, a RAM (random access memory) to temporarily store the data to be used in the processing of the main control section 11, and the like.

The storage section 17 has an update-data storage area 17*a* temporarily storing the update data to be displayed on the liquid-crystal display 22 when the main control section 11 performs the processes of on-screen display and screen update. The main control section 11 acquires the update data and delivers it to the display control section 14, thereby executing the processes of on-screen display and screen update on the liquid-crystal display 22. The program, for the main control section 11 to perform the processes of on-screen display and screen update, is stored in the ROM for example.

Figure 2:
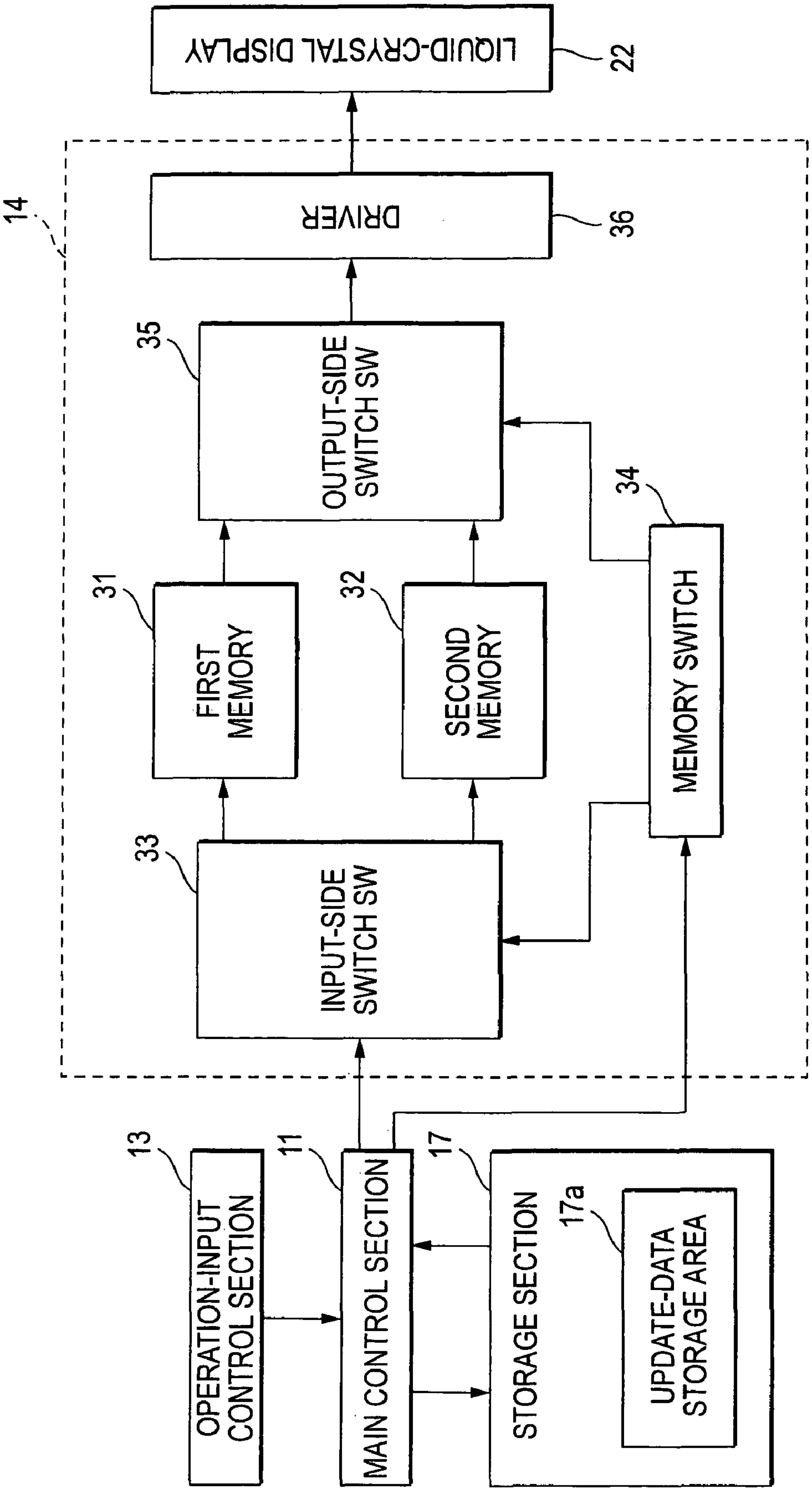
FIG. 2 shows a functional block diagram of a display control section of the mobile phone.

The display control section 14 is to perform a screen update process to update the screen as mentioned above when there is an input on the operation key 24 or when there is a need to rewrite the screen depending upon the process the main control section 11 is carrying out. On this occasion, the display control section 14 uses a method of performing the process of screen update while switching between two frame buffers. The two frame buffers, i.e. a first memory 31 and a second memory 32, are provided to temporarily store the update data to be displayed on the liquid-crystal display 2, as shown in FIG. 2.

An input-side switch SW 33 is provided on the input side of the first and second memories 31, 32. The input-side switch SW 33 is to switch, to any of the first and second memories 31 and 32, the destination of the update data to be displayed on the liquid-crystal display 22, according to the instruction from the control section 11 through a memory selector 34. When inputted from the main control section 11 the update data to be displayed on the liquid-crystal display 22, the input-side switch SW 33 delivers the update data to the frame buffer (any of the first and second buffers 31 and 32) being connected.

Meanwhile, an output-side switch SW 35 is provided on the output side of the first and second memories 31 and 32. The output-side switch SW 35 is to switch, to any of the first and second memories 31 and 32, the destination of the update data to be displayed on the liquid-crystal display 22, according to the instruction from the control section 11 through the memory selector 34. The control section 11 reads the update data, to be displayed on the liquid-crystal display 22, out of the frame buffer (any of the first and second memories 31 and 32) being connected by the output-side switch SW 35. Thus, control is made to make a display on the liquid-crystal display 22 through a driver 36.

Incidentally, the update data is inputted to the first or second memory 31, 32 and displayed on the liquid-crystal display from the first or second memory 31, 32 through the driver 36 at respective rates different from each other, under control of the main control section 11 (e.g. the input of update the data to the first or second memory 31, 32 is at a rate of 10 per second while the display control of same onto the liquid-crystal display 22 is at a rate of 20 per second).

Figure 3A:
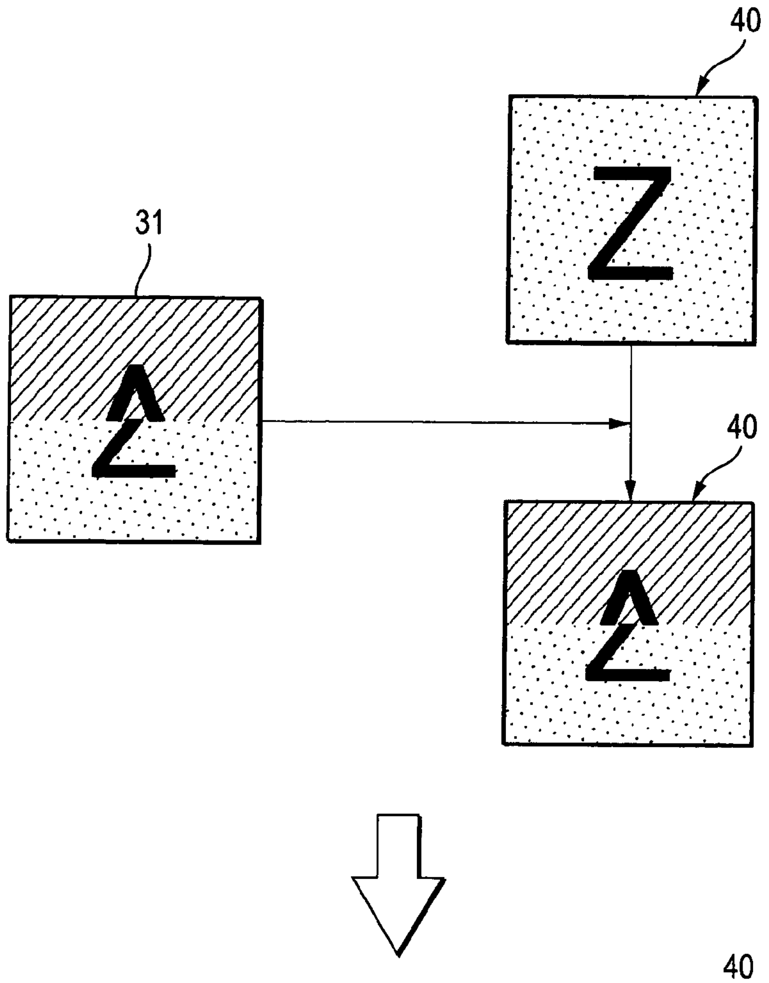
FIGS. 3A, 3B are figures for explaining a single buffer.
Figure 3B:
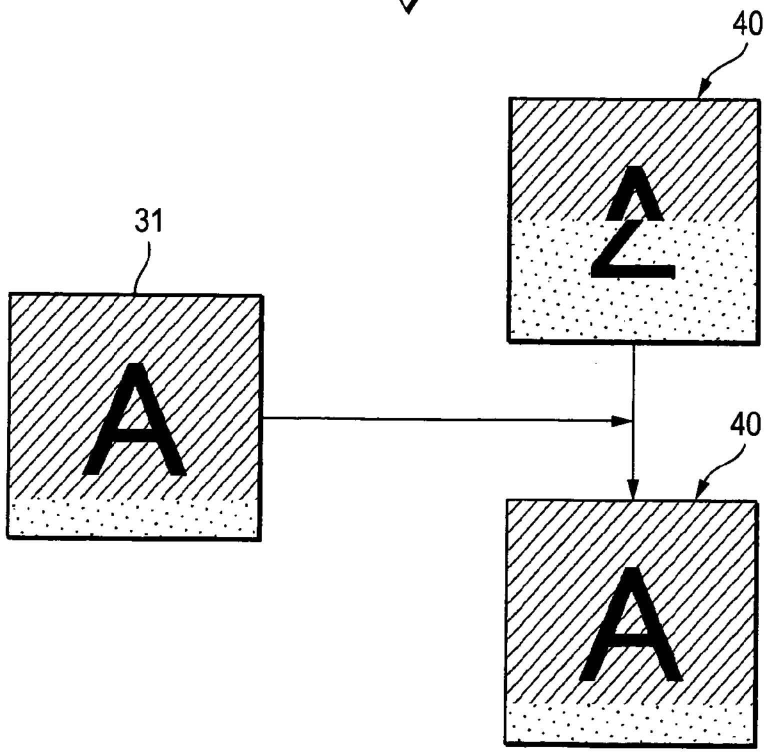

Here, the scheme, used in image update, includes a single buffer using one frame buffer and a double buffer using two frame buffers. With the single buffer, the update data inputted to and outputted from one frame buffer (e.g. first memory 31) is then displayed, in order, on the screen 40 of the liquid-crystal display 22, as shown in FIGS. 3(A) and 3(B). For example, in the case that the first memory 31 inputs therein the update data for displaying a character "A" when a character "Z" is being displayed on the screen 40, the data inputted to the first memory 31 is displayed, in order, on the screen 40. Where write speed is lower than display update speed, there is a possibility that the characters "Z" and "A" are displayed in a state partially rewritten on the screen 40, as shown in FIGS. 3A and 3B.

Figure 4A:
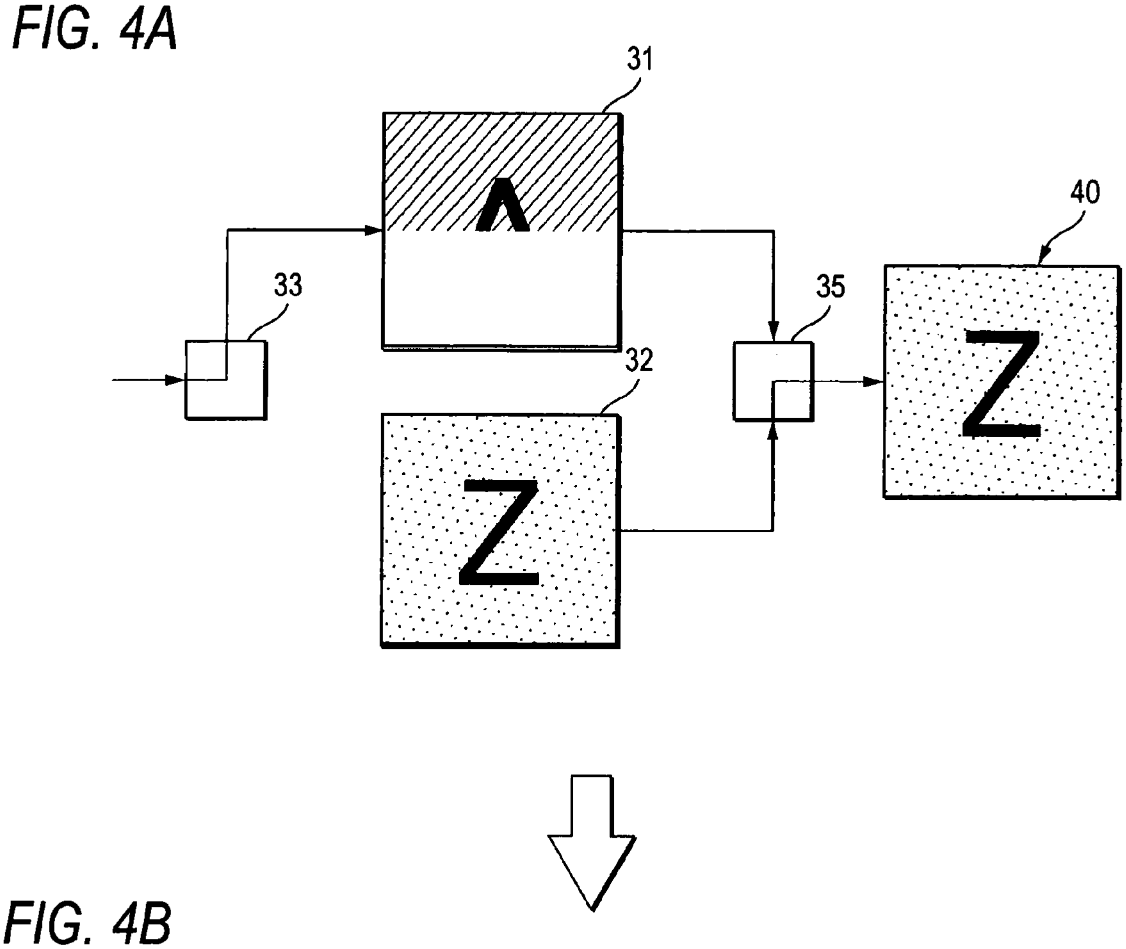
FIGS. 4A, 4B are figures for explaining a double buffer.
Figure 4B:
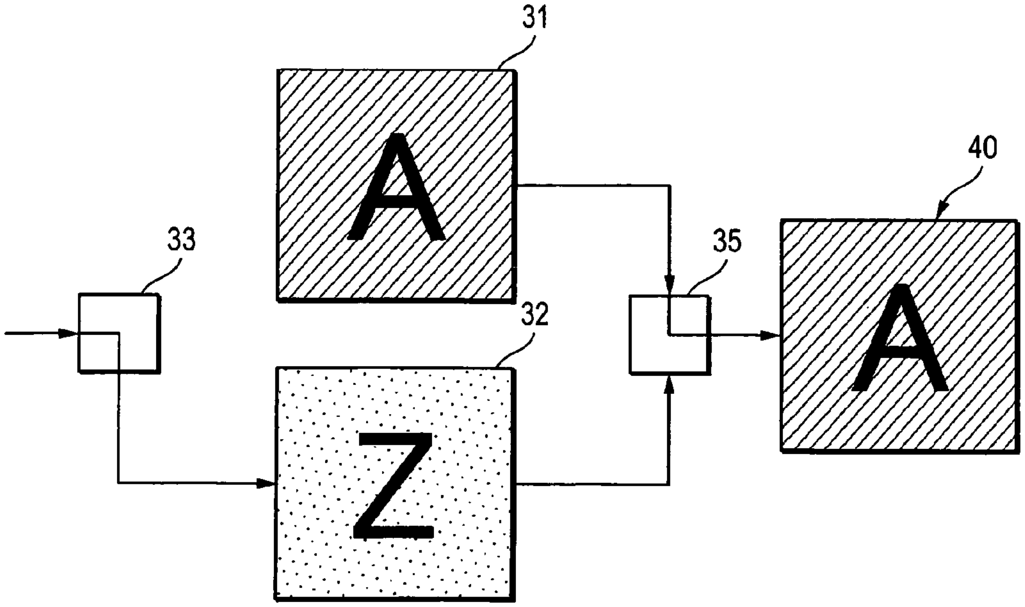

With the double buffer, control is made such that the update data is inputted to any one of the two frame buffers so that, when the input is completed, the data of the relevant frame buffer is displayed on the screen 40, as shown in FIGS. 4(A) and 4(B). Namely, while one frame buffer is inputting therein the update data, the other frame buffer is outputting the data displayed earlier. For example, when the character "Z" outputted from the second memory 32 is being displayed on the screen 40, in case the update data for displaying a character "A" whose content is to be next displayed is inputted to the first memory 31 as shown in FIG. 4(A), the character "Z" outputted from the second memory 32 is displayed on the screen 40 during the input of the update data. When the first memory 31 is completely inputs therein the update data for displaying a character "A", the update data is transferred from the first memory 31 onto the liquid-crystal display 22 as shown in FIG. 4(B) where the character "A" is displayed on the screen 40. On this occasion, when the next data is inputted, it is inputted to the second memory 32.

In the case of using the single buffer, the frame buffer after inputting therein the update data immediately outputs it onto the liquid-crystal display, thus having an advantage that display processing is high in speed. On the contrary, the example shown in FIGS. 3(A) and 3(B) has a disadvantage that tearing occurs on the screen 40 because the character "Z" initially displayed and the character "A" to write are possibly displayed on the same screen.

Meanwhile, in the case of using the double buffer, while one frame buffer inputs therein the update data, the other frame buffer is outputting the display data. Because it outputs the update data to the liquid-crystal display 22 at a time the frame buffer completes the input of the update data, there is no possibility of displaying the preceding and succeeding display contents on the same screen, providing the advantage that tearing does not occur. On the contrary, because the update data is not outputted to the liquid-crystal display 22 at all until the frame buffer completely inputs the update data, there is a disadvantage that display processing is low in speed.

Figure 5A:
FIGS. 5A, 5B are figures for explaining an example that the update range is equal to or broader than a predetermined range in the process of screen update for the mobile phone.
Figure 5B:
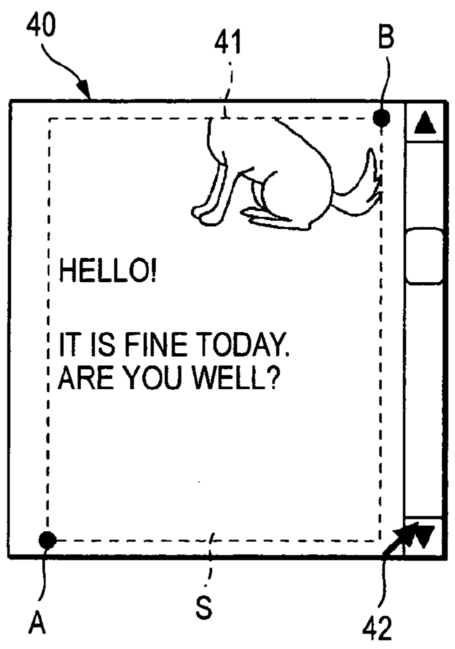
Figure 6A:
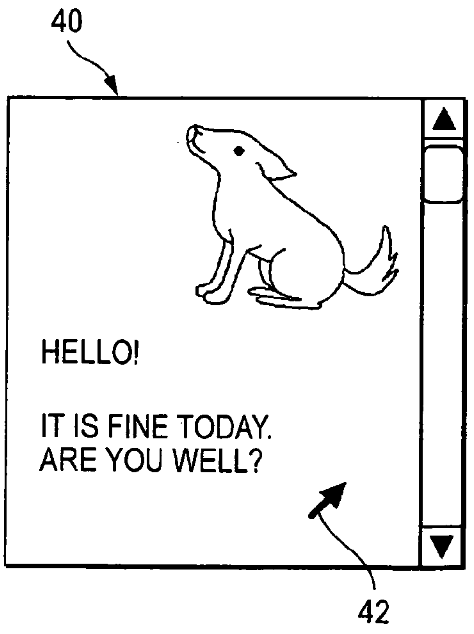
FIGS. 6A, 6B are figures for explaining an example that the update range is equal to or smaller than the predetermined range in the process of screen update for the mobile phone.
Figure 6B:
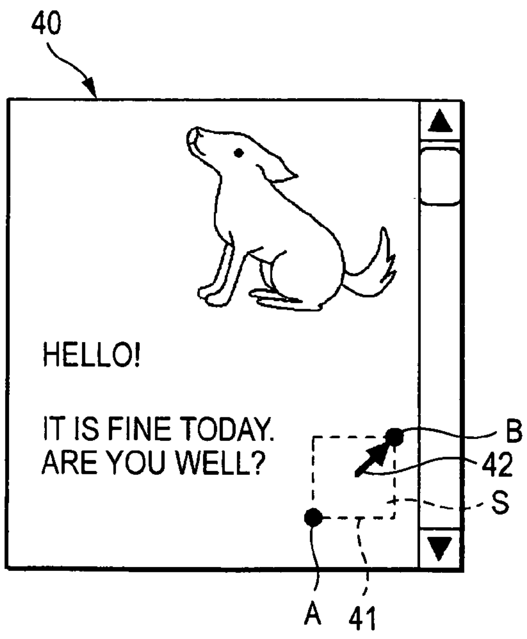

Meanwhile, in updating the screen 40 of the liquid-crystal display 22, the niceness on the screen is given priority in certain cases whereas the speediness of processing is given priority in other cases. For example, where screen update range 41 is broad in area S on the screen 40, e.g. when scrolling the screen entirety as shown in FIG. 5, the range (screen update range 41) where tearing possibly occurs is broad thus uncomfortably inflicting tearing upon the user to a significant degree. In this case, priority is given for the niceness of on-screen display. For example, where the screen update range 41 is narrow in area S on the screen 40, e.g. when moving the cursor (pointing device) 42 as shown in FIG. 6, the range (screen update range 41) where tearing possibly occurs is narrow so that priority is given to the speediness of display processing because the niceness of on-screen display is less problematic.

Based on advantages and disadvantages, the mobile phone 1 is allowed to select the scheme of single or double buffer depending upon the area S of the screen update range 41 when updating the screen 40. By the operation suited for the purpose upon updating the screen 40, screen update is available through effectively making use of the merits of the both. Completely architecting the rendering-update (difference) data, the main control section 11 starts a process to transfer the update data to the update control section 14. The screen update process in this case is executed in accordance with the following conditions.

(1) Screen update process with the double buffer where the screen update range 41 has an area S equal to or greater than a predetermined value.

(2) Screen update process with the single buffer where the screen update range 41 has an area S smaller than the predetermined value.

The area S of the screen update range 41 has a predetermined value indicative of a boundary value of whether or not the single-buffer scheme or the double-buffer scheme is preferably applied for the range to be updated in the process of screen update, which value is previously stored in the storage section 17 for example. The predetermined value is determined based upon the type of an application program for executing the process of on-screen display or screen update. This is because, in some cases, priority is given for the niceness of screen 40, e.g. moving-image display process, while, in other cases, priority is given for the speediness of display processing, e.g. menu display process.

Figure 7:
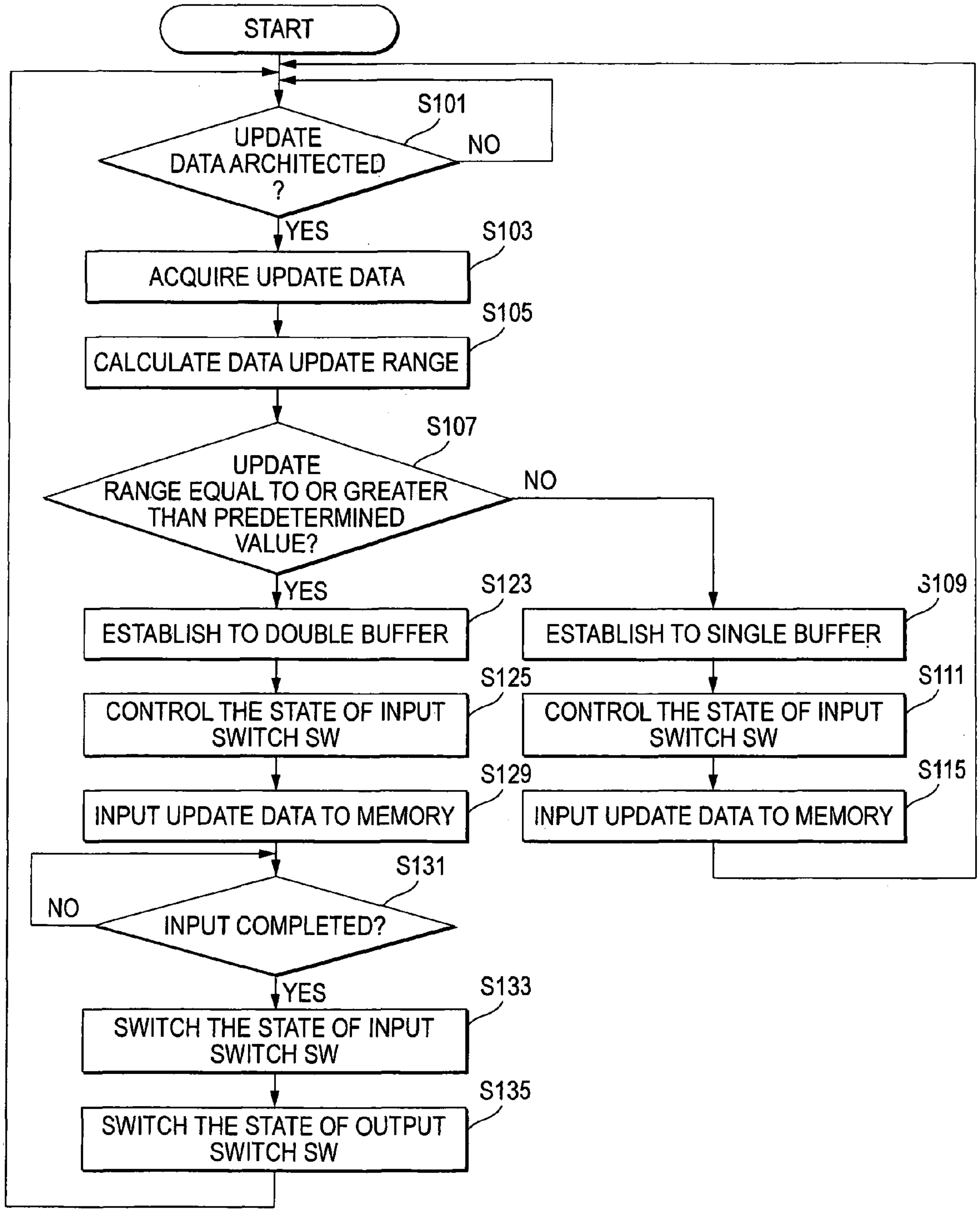
FIG. 7 is a flowchart showing a procedure to execute the process of screen update in the mobile phone.

Based upon a flowchart shown in FIG. 7, explanation is made on a procedure that the mobile phone 1 executes a screen update process on the basis of the area S of the screen update range 41. It is assumed that the input-side switch SW 33 and the output-side switch SW 35 are initially connected to the first memory 31. From now on, the term "step" is omitted in explanation, e.g. "S101" for "step S101".

In the mobile phone 1, when there firstly arises a necessity to rewrite the screen 40 of the liquid-crystal display 22, e.g. user's input through the operation key 21 or data reception in the mail browser, the main control section 11 architects rendering-update (difference) data and stores the update data in the update-data storage area 17*a* of the storage section 17.

The main control section 11 determines whether or not update data is architected (S101). When update data is not architected (no at S101), the main control section waits as it is. When update data is architected (yes at S101), the main control section 11 acquires update data from the update-data storage area 17*a* (S103).

The main control section 11 calculates the area S of the screen update range 41 on the screen 40 depending upon the update data acquired at S103 (S105). The area S of the screen update range 41 is desirably calculated as an area of a rectangle having diagonal apexes at points A and B, by use of the lower left point A and the upper right point B of the screen update range 41. However, by a method other than this, un-updated data and updated data may be compared so that, based thereon, data can be determined for the range to update.

The main control section 11 determines whether or not the screen update range 41 calculated at S105 has an area S equal to or greater than a predetermined value (S107). The predetermined value indicates a boundary value of which one of the single-buffer and double-buffer schemes is preferably applied for the range to update in the screen update process, which value is previously stored in the storage section 17.

When the area S of the screen update range 41 is not equal to or greater than a predetermined value (no at S107), the main control section 11 establishes the single buffer with the single-buffer scheme (S109). When established with the single buffer, the input-side switch SW 33 is controlled to make a preparation for a screen update process based on the single buffer (S111). Specifically, in case the input-side switch SW 33 and the output-side switch SW 35 are connected to the same memory, those are kept as they are. In case the input-side switch SW 33 and the output-side switch SW 35 are connected to different memories, the input-side switch SW 33 are switched over to the other memory. The output-side switch SW 35 is controlled to be held as it is.

After completing the preparation for a screen update process based on the single buffer at S111, the main control section 11 inputs the update data to the memory connected to the input-side switch SW 33 (S115).

From then on, when display is made on the liquid-crystal display 22, control is made to read, for outputting, the update data out of the memory that was connected to the output-side switch SW 35 at S111. The update data, from the memory, is displayed on the liquid-crystal display 22 in the desired timing asynchronous with that of the flowchart shown in FIG. 7.

Figure 8A:
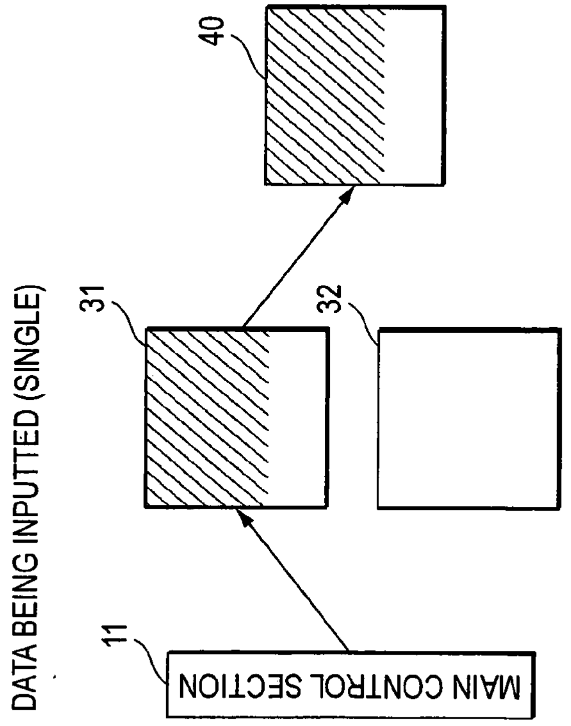
FIGS. 8A, 8B are figures for explaining the case that the process of screen update is implemented with a single buffer, in the mobile phone.
Figure 8B:
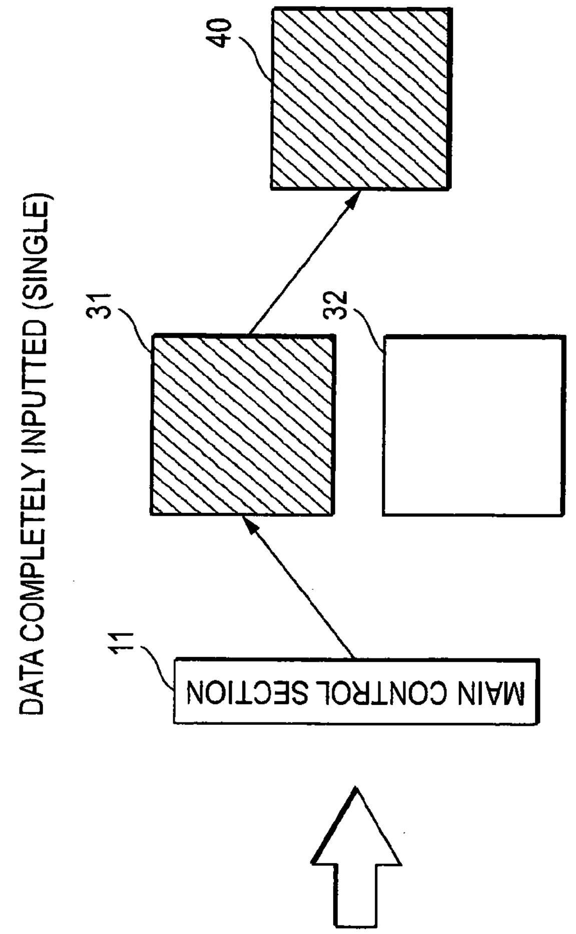

For example, when the input-side switch SW 33 at S109 was connected to the first memory 31 as shown in FIGS. 8(A) and 8(B), the connection to the first memory 31 is maintained at S111. When the output-side switch SW 35 was connected to the first memory 31, the connection to the first memory 31 is maintained at S113. When update data is inputted through the input-side switch SW 33, the update data is temporarily stored in the first memory 31. In other timing than the flow of FIG. 7, the update data is conveyed from the first memory 31 to the liquid-crystal display 22 where the update data is displayed on the screen 40.

For example, as shown in FIG. 8(B), after the update data, outputted from the output-side switch SW 35, is conveyed to the liquid-crystal display 22, the state shown in FIG. 8(A) is maintained as it is. Namely, in the case the input-side switch SW 33 at S109 was connected to the first memory 31, the connection to the first memory 31 is being maintained at S119. In the case the output-side switch SW 35 at S109 was connected to the first memory 31, the connection to the first memory 31 is being maintained at S121. In this case, the screen 40 of the liquid-crystal display 22 is in a state that the update data stored in the first memory 31 is being displayed on the screen 40.

Referring back to the explanation of the flowchart shown in FIG. 7, when the screen update range 41 has an area S equal to or greater than a predetermined value (Yes at S107), the main control section 11 establishes a screen update process with the double buffer because priority is given for the niceness on the screen 40 rather than the speediness of display processing (S123). After established with the double buffer, the input-side switch SW 33 is controlled to make a preparation for a screen update process based on the double buffer (S125). Specifically, when the input-side switch SW 33 and the output-side switch SW 35 are connected to the different memories, those are maintained as they are. When the input-side switch SW 33 and the output-side switch SW 35 are connected to the same memory, the input-side switch SW 33 is switched over to the other memory. The output-side switch SW 35 is controlled to be held as it is.

After completing the preparation of a screen update process with the double buffer at S125, the main control section 11 inputs the update data to the memory connected to the input-side switch SW 33 (S129).

When to display the update data, from then on, on the liquid-crystal display 22, control is made at S125 such that the update data is read, for outputting, out of the memory connected to the output-side switch SW 35. The update data, from the memory, is displayed on the liquid-crystal display 22 in the desired timing (e.g. 20 times per second) asynchronous with that of the flowchart shown in FIG. 7. The frame buffer, inputted with the update data, stores the update data without outputting it until the next data is inputted.

Then, the main control section 11 at S129 determines whether or not the update data is completely inputted to the first or second memory 31, 32 (S131). When the update data is not completely inputted (no at S131), the main control section 11 waits until the update data is completely inputted.

When the update data is completely inputted to the first or second memory 31, 32 (yes at S131), the main control section 11 instructs the memory selector 34 to change the state of the input-side switch SW33 (S133). Receiving the instruction, the memory selector 34 causes the input-side switch SW 33 to switch to the second memory 32 when it is connected to the first memory 31. When it is connected to the second memory 32, the input-side switch SW 33 is switched to the first memory 31.

Meanwhile, the main control section 11 instructs the memory selector 34 to change the state of the output-side switch SW 35 (S135). Receiving the instruction, the memory selector 34 causes the output-side switch SW 35 to change over to the second memory 32 when it is connected to the first memory 31. When it is connected to the second memory 32, the output-side switch SW 35 is switched to the first memory 31.

The update data, inputted to the first or second memory 31, 32 at S129, is outputted from the first or second memory 31, 32 through the switchover of the output-side switch SW 35 at S135 when output control is made in the later.

Figures 9A, 9B:
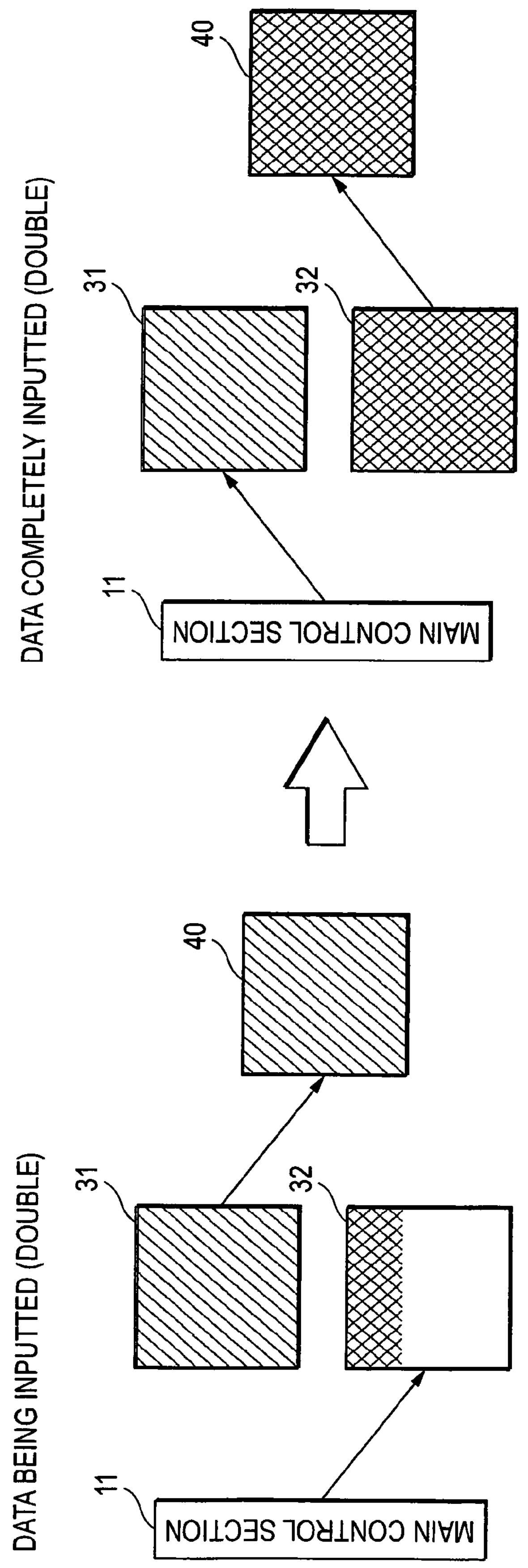
FIGS. 9A, 9B are figures for explaining the case that the process of screen update is implemented with a double buffer, in the mobile phone.

For example, in case the input-side switch SW 33 connected at S125 to the second memory 32 is switched at S133 to the first memory 31 and the update data is completely inputted to the second memory 32 as shown in FIGS. 9(A) and 9(B), the output-side switch SW 35 connected at S125 to the first memory 31 is switched at S135 to the second memory 32 where the update data is stored. Accordingly, the update data, stored in the second memory 32, is displayed on the screen of the liquid-crystal display 22.

After the screen update process according to the single-buffer scheme at S109 to S115 or the screen update process according to the double-buffer scheme at S123 to S135, the process returns again to S101. The main control section 11 determines whether or not architected update data to be displayed on the screen 40.

Figures 10A, 10B:
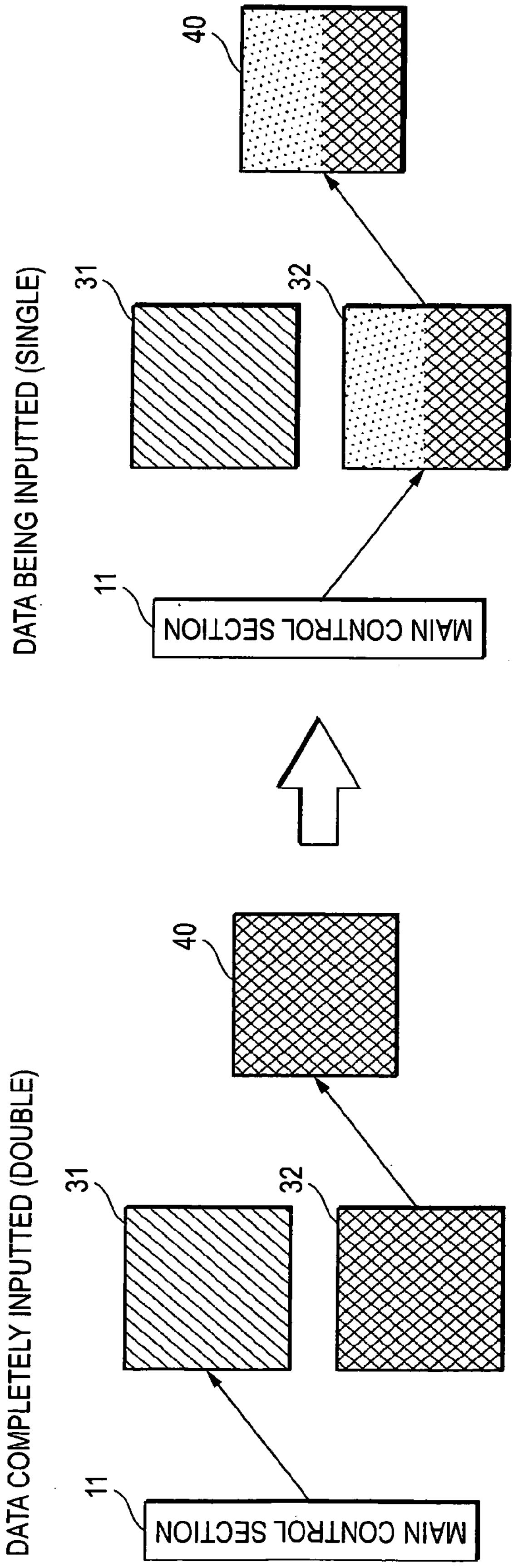
FIGS. 10A, 10B are figures for explaining the case that the process of screen update is implemented by switching from the double buffer over to the single buffer, in the mobile phone.

It is assumed that, returning to S101 from the state shown in FIG. 9(B) for example, update data is architected at S101, wherein FIG. 10 shows a state that the update data is being inputted under the setting of the single buffer established at S109 wherein the screen update range 41 on the screen 40 has an area S smaller than a predetermined value (no at S107). Although the input-side switch SW 33 was connected at S109 to the first memory 31 as shown in FIG. 10(A), it is switched and connected at S111 to the second memory 32 as shown in FIG. 10(B). When the update data is inputted by the input-side switch SW 33, the update data is temporarily stored in the second memory 32. When output control is made later, the update data is delivered from the second memory 32 to the liquid-crystal display 22, to display the update data on the screen 40.

Figures 11A, 11B:
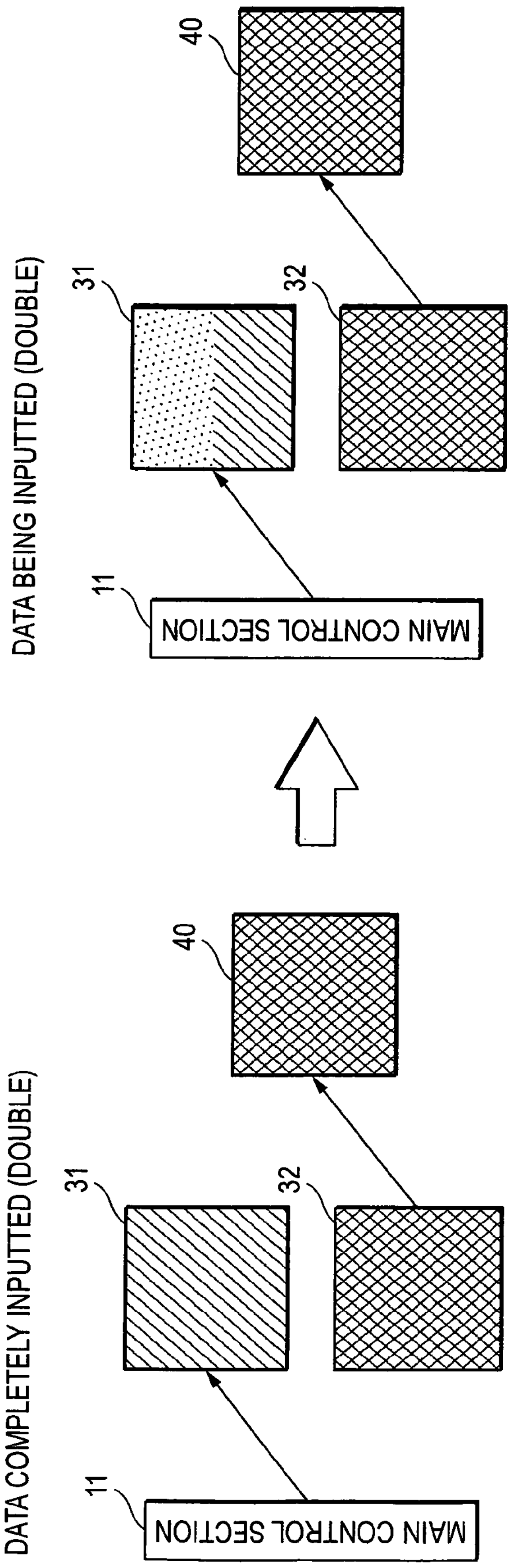
FIGS. 11A, 11B are figures for explaining the case that the process of screen update is implemented by switching from the double buffer over to the double buffer, in the mobile phone.

Likewise, it is assumed that, returning to S101 from the state shown in FIG. 9(B) for example, update data is architected at S101, wherein FIG. 11 shows a state that the update data is being inputted under the setting of the double buffer established at S123 wherein the screen update range 41 on the screen 40 has an area S equal to or greater than the predetermined value (yes at S107). Because the input-side switch SW 33 was connected at S123 to the first memory 31 as shown in FIG. 11(A), it is maintained connected at S125 to the first memory 31 as shown in FIG. 11(B). When the update data is inputted by the input-side switch SW 33, the update data is stored in the first memory 31. During the inputting, the update data already stored in the second memory 32 is delivered to the liquid-crystal display 22, to display it on the screen 40.

In this manner, in the process of screen update, the mobile phone 1 uses the double-buffer scheme where the screen update range 41 has an area S broad on the screen 40 and the single-buffer scheme where the screen update range 41 has an area S narrow on the screen 40.

According to the embodiment, by selecting the single-buffer or double-buffer scheme in accordance with the area S of the screen update range 41 upon updating the screen 40, usability can be improved in respect of on-screen display.

Incidentally, the process of the step S105 corresponds to a calculating unit, the process of the steps S111, S125 and S133 to an input-side switch unit and the process of the step S135 to output-side switch unit.

According to the above-described embodiment, display is made by selecting a single-buffer scheme or a double-buffer scheme depending upon the update range of screen. This makes it possible to execute a screen update process excellent in usability while taking account of the balance between the speediness of display processing and the niceness of on-screen display.

The embodiment is not limited to the mobile phone 1 though explained thereon. Namely, it may be an information processing terminal in which the process of on-screen display is carried out, e.g. a PHS (personal handyphone system), a PDA (personal digital assistant) or a PC (personal computer).

What is claimed is:

1. A mobile phone comprising:

a control unit configured to store image data into one of a first buffer and a second buffer, and calculate an update range by comparing a current image data and a previous image data;

a display control unit configured to output the image data from said one of the first buffer and the second buffer, and display the output image data on a display unit;

a first switch unit configured to connect the control unit with one of the first buffer and the second buffer;

a second switch unit configured to connect one of the first buffer and the second buffer with the display control unit; and a switch control unit configured to control the first switch unit and the second switch unit such that: (i) when the update range is at least equal to a predetermined value, the image data is alternatively stored into one of the first buffer and the second buffer and is output from the other one of the first buffer and the second buffer, which is then not connected to the control unit via the first switch unit, and (ii) when the update range is less than the predetermined value, the image data is stored into and output from a same one of the first buffer and the second buffer.

2. The mobile phone according to claim 1, wherein the control unit calculates the update range by obtaining a difference between the previous image data and the current image data.

3. The mobile phone according to claim 1, wherein the predetermined value is determined based on a type of an application program executing a screen update process.

4. The mobile phone according to claim 1, wherein when improved display image quality is prioritized, the image data is alternatively stored into one of the first buffer and the second buffer and is output from the other one of the first buffer and the second buffer, which is then not connected to the control unit via the first switch unit.

5. The mobile phone according to claim 1, wherein when processing speed is prioritized, the image data is stored into and output from the same one of the first buffer and the second buffer.

6. A mobile phone comprising:

a control unit configured to store image data into one of a first buffer and a second buffer, and calculate an update range by comparing first image data and second image data which is temporally adjacent to the first image data;

a display control unit configured to output the image data from said one of the first buffer and the second buffer, and display the output image data on a display unit;

a first switch unit configured to connect the control unit with one of the first buffer and the second buffer;

a second switch unit configured to connect one of the first buffer and the second buffer with the display control unit; and a switch control unit configured to control the first switch unit and the second switch unit such that: (i) when the update range is at least equal to a predetermined value, the image data is alternatively stored into one of the first buffer and the second buffer and is output from the other one of the first buffer and the second buffer, which is then not connected to the control unit via the first switch unit, and (ii) when the update range is less than the predetermined value, the image data is stored into and output from a same one of the first buffer and the second buffer.

7. The mobile phone according to claim 6, wherein the control unit calculates the update range by obtaining a difference between the first image data and the second image data.

8. The mobile phone according to claim 6, wherein the predetermined value is determined based on a type of an application program executing a screen update process.

9. The mobile phone according to claim 6, wherein when improved display image quality is prioritized, the image data is alternatively stored into one of the first buffer and the second buffer and is output from the other one of the first buffer and the second buffer, which is then not connected to the control unit via the first switch unit.

10. The mobile phone according to claim 6, wherein when processing speed is prioritized, the image data is stored into and output from the same one of the first buffer and the second buffer.

11. An information processing terminal comprising:

a control unit configured to store image data into one of a first buffer and a second buffer, and calculate an update range by comparing a current image data and a previous image data;

a display control unit configured to output the image data from said one of the first buffer and the second buffer, and display the output image data on a display unit;

a first switch unit configured to connect the control unit with one of the first buffer and the second buffer;

a second switch unit configured to connect one of the first buffer and the second buffer with the display control unit; and a switch control unit configured to control the first switch unit and the second switch unit such that: (i) when the update range is at least equal to a predetermined value, the image data is alternatively stored into one of the first buffer and the second buffer and is output from the other one of the first buffer and the second buffer, which is then not connected to the control unit via the first switch unit, and (ii) when the update range is less than the predetermined value, the image data is stored into and output from a same one of the first buffer and the second buffer.

12. The information processing terminal according to claim 11, wherein the control unit calculates the update range by obtaining a difference between the previous image data and the current image data.

13. The information processing terminal according to claim 11, wherein the predetermined value is determined based on a type of an application program executing a screen update process.

14. A display processing control method for an information processing terminal which comprises a control unit configured to store image data into one of a first buffer and a second buffer, a display control unit configured to output the image data from said one of the first buffer and the second buffer and display the output image data on a display unit, a first switch unit configured to connect the control unit with one of the first buffer and the second buffer, and a second switch unit configured to connect one of the first buffer and the second buffer with the display control unit, the method comprising:

calculating an update range by comparing a current image data and a previous image data;

when the calculated update range is at least equal to a predetermined value, alternatively storing the image data into one of the first buffer and the second buffer, and outputting the image data from the other one of the first buffer and the second buffer, which is then not connected to the control unit via the first switch unit;

when the calculated update range is less than the predetermined value, storing and outputting the image data from a same one of the first buffer and the second buffer; and displaying the output image data on the display unit.

15. The display processing control method according to claim 14, wherein the update range is calculated by obtaining a difference between the previous image data and the current image data.

16. The display processing control method according to claim 14, wherein the predetermined value is determined based on a type of an application program executing a screen update process.

17. A non-transitory storage or memory storing a computer readable program for an information processing terminal which comprises a control unit configured to store image data into one of a first buffer and a second buffer, a display control unit configured to output the image data from said one of the first buffer and the second buffer and display the output image data on a display unit, a first switch unit configured to connect the control unit with one of the first buffer and the second buffer, and a second switch unit configured to connect one of the first buffer and the second buffer with the display control unit, the program being executable by the information processing terminal to perform functions comprising:

calculating an update range by comparing a current image data and a previous image data;

when the calculated update range is at least equal to a predetermined value, alternatively storing the image data into one of the first buffer and the second buffer, and outputting the image data from the other one of the first buffer and the second buffer, which is then not connected to the control unit via the first switch unit;

when the calculated update range is less than the predetermined value, storing and outputting the image data from a same one of the first buffer and the second buffer; and displaying the output image data on the display unit.

* * * * *

UNITED STATES PATENT AND TRADEMARK OFFICE

CERTIFICATE OF CORRECTION

PATENT NO. : 7,937,114 B2
APPLICATION NO. : 12/001198
DATED : May 3, 2011
INVENTOR(S) : Yamagishi It is certified that error appears in the above-identified patent and that said Letters Patent is hereby corrected as shown below:

Title Page, Item (73), under “Assignee”, in Column 1, Line 1, delete “Fujitsu Toshiba Mobile Communication Limited” and insert -- Fujitsu Toshiba Mobile Communications Limited --, therefor.

Signed and Sealed this
Twenty-fourth Day of July, 2012

David J. Kappos
*Director of the United States Patent and Trademark Office*